(12) United States Patent
Chen et al.

(10) Patent No.: US 9,093,021 B2
(45) Date of Patent: Jul. 28, 2015

(54) METHODS, APPARATUSES, AND DEVICES FOR RENDERING INDOOR MAPS ON A DISPLAY

(71) Applicant: QUALCOMM Incorporated, San Diego, CA (US)

(72) Inventors: Jiajian Chen, San Jose, CA (US); Hui Chao, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/794,284

(22) Filed: Mar. 11, 2013

(65) Prior Publication Data

US 2014/0253582 A1    Sep. 11, 2014

(51) Int. Cl.
| | | |
|---|---|---|
| *G09G 5/00* | (2006.01) | |
| *G09G 5/02* | (2006.01) | |
| *H04N 1/60* | (2006.01) | |
| *G06K 9/00* | (2006.01) | |
| *G06K 9/40* | (2006.01) | |
| *H04N 5/57* | (2006.01) | |
| *G09G 5/30* | (2006.01) | |
| *G01C 21/20* | (2006.01) | |
| *G01C 21/36* | (2006.01) | |

(52) U.S. Cl.
CPC .............. *G09G 5/30* (2013.01); *G01C 21/206* (2013.01); *G01C 21/3682* (2013.01); *G09G 5/02* (2013.01); *H04N 1/6058* (2013.01)

(58) Field of Classification Search
USPC ......... 345/589–590, 591, 593–595, 600, 601, 345/604, 619, 630, 660, 549, 690, 77, 84; 348/223.1, 254, 366, 552, 557, 602, 348/612, 655, 687; 358/516, 518–520, 523; 382/162, 165–167, 254, 274, 293, 382/298–299; 707/705, 747, 758, 769–770; 701/438, 425–426, 468, 491, 537–538, 701/541, 517; 711/216, 221, 200; 455/3.01, 455/419, 426.2, 95, 456.6
See application file for complete search history.

(56) References Cited

U.S. PATENT DOCUMENTS

| | | | |
|---|---|---|---|
| H1506 H | * | 12/1995 | Beretta .......................... 345/591 |
| 6,603,469 B1 | | 8/2003 | Gettemy et al. |
| 8,219,318 B2 | | 7/2012 | Kreft |
| 2002/0049533 A1 | | 4/2002 | Kusano et al. |
| 2006/0061586 A1 | | 3/2006 | Brulle-Drews et al. |
| 2009/0144660 A1 | | 6/2009 | Wako |
| 2010/0088631 A1 | | 4/2010 | Schiller |

(Continued)

FOREIGN PATENT DOCUMENTS

WO    WO-2014045155 A1    3/2014

OTHER PUBLICATIONS

International Search Report and Written Opinion—PCT/US2014/020049—ISA/EPO—Jul. 1, 2014.

*Primary Examiner* — Wesner Sajous
(74) *Attorney, Agent, or Firm* — Berkeley Law & Technology Group, LLP

(57) ABSTRACT

Methods, apparatuses, and devices for rendering indoor maps on a display device of, for example, a mobile device, are presented. In one example, a processor of a mobile device may receive identifiers, such as alphanumeric identifiers, for points of interest (POI) and map at least portions of the identifiers to colors within a suitable color space, such as a RGB color space.

43 Claims, 4 Drawing Sheets

(56) References Cited

U.S. PATENT DOCUMENTS

| | | |
|---|---|---|
| 2010/0305849 A1 | 12/2010 | Nirhamo |
| 2011/0161875 A1 | 6/2011 | Kankainen |
| 2011/0313649 A1 | 12/2011 | Bales et al. |
| 2012/0130632 A1 | 5/2012 | Bandyopadhyay et al. |
| 2012/0316780 A1* | 12/2012 | Huth .............................. 701/450 |
| 2013/0101163 A1* | 4/2013 | Gupta et al. ................... 382/103 |
| 2013/0211719 A1* | 8/2013 | Boschker et al. .............. 701/533 |
| 2013/0212509 A1* | 8/2013 | Van Seggelen et al. ....... 715/771 |
| 2013/0332279 A1* | 12/2013 | Kuusela et al. ............. 705/14.57 |
| 2014/0132767 A1* | 5/2014 | Sonnabend et al. ........... 348/148 |
| 2014/0304286 A1* | 10/2014 | Hancock ........................ 707/758 |
| 2014/0315581 A1* | 10/2014 | Gupta et al. ................. 455/456.2 |

\* cited by examiner

METHODS, APPARATUSES, AND DEVICES FOR RENDERING INDOOR MAPS ON A DISPLAY

BACKGROUND

1. Field

The subject matter disclosed herein relates to mobile electronic devices, and more particularly to methods, apparatuses, and articles of manufacture which may be used in association with rendering maps on a display device of a mobile electronic device.

2. Information

GPS and other like satellite positioning systems have enabled navigation services for mobile handsets in outdoor environments. However, since satellite signals may not be reliably received and/or acquired in an indoor environment, different techniques may be employed to enable indoor navigation services. For example, a mobile device may typically obtain a position fix by measuring ranges to three or more terrestrial wireless access points that may be positioned at known locations. Such ranges may be measured, for example, by obtaining a MAC ID address from signals received from such access points and measuring one or more characteristics of signals received from such access points such as, for example, signal strength, round trip delay, just to name a few examples.

In some implementations, an indoor navigation system may provide a digital electronic map to a mobile device as a mobile device may enter a particular indoor area. Such a map may show indoor features such as doors, hallways, entry ways, walls, etc. A digital electronic map of an indoor area may also show points of interest (POIs) such as bathrooms, restaurants, cafés, stores, kiosks, etc. Such a digital electronic map may be stored at a server to be accessible by a mobile device through selection of a universal resource locator (URL), for example. By obtaining and displaying such a map, a mobile device may place a current location of the mobile device and a location of an associated user on the displayed map to provide the user with additional context.

However, digital electronic maps displayed on a mobile device may occasionally become cluttered with multiple POIs, which may reduce the readability of the mobile device display. In such instances, a user may find themselves straining to discern a specific POI, in which the user may have a particular interest, from other POIs that may be of lesser interest to the user.

SUMMARY

Briefly, particular implementations are directed to a method comprising, at a mobile device, receiving a digital map from a transmitter over a wireless communication channel, the digital map identifying one or more points of interest (POIs) with at least a location on the digital map and an identifier. The method may further include, for at least one of the one or more POIs, mapping the identifier to a color, and generating an image of the digital map depicting a portion of the digital map at a location of the at least one of the one or more POIs as having the color.

Another particular implementation may be directed to a mobile device comprising a receiver configured to receive signals over a wireless communication channel. The mobile device may additionally comprise one or more processors, coupled to the receiver, to map a color to the at least one POI based, at least in part, on an identifier of the at least one POI. The one or more processors may additionally generate an image of a digital map, wherein the at least one POI is depicted on the image of the digital map with the identified color.

Another particular implementation may be directed to an article comprising a storage medium that comprises machine-readable instructions stored thereon which are executable by one or more processors of a mobile device to obtain at least one identifier for one or more points of interest (POIs) over a wireless communications channel. The machine-readable instructions may also direct the one or more processors to map the at least one identifier to a color, and to generate an image of a digital map, wherein the generated image depicts a portion of the digital map at a location of one or more POIs as having the color.

Another particular implementation may be directed to a mobile device comprising means for wirelessly receiving a digital map from a transmitter, the digital map identifying one or more points of interest (POIs) with at least a location on the digital map and an identifier. The mobile device may also comprise means for mapping at least one of the one or more POIs to a color, and means for generating an image of the digital map, the generated image depicting a portion of the digital map at a location of the at least one of the one or more POIs as having the color.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
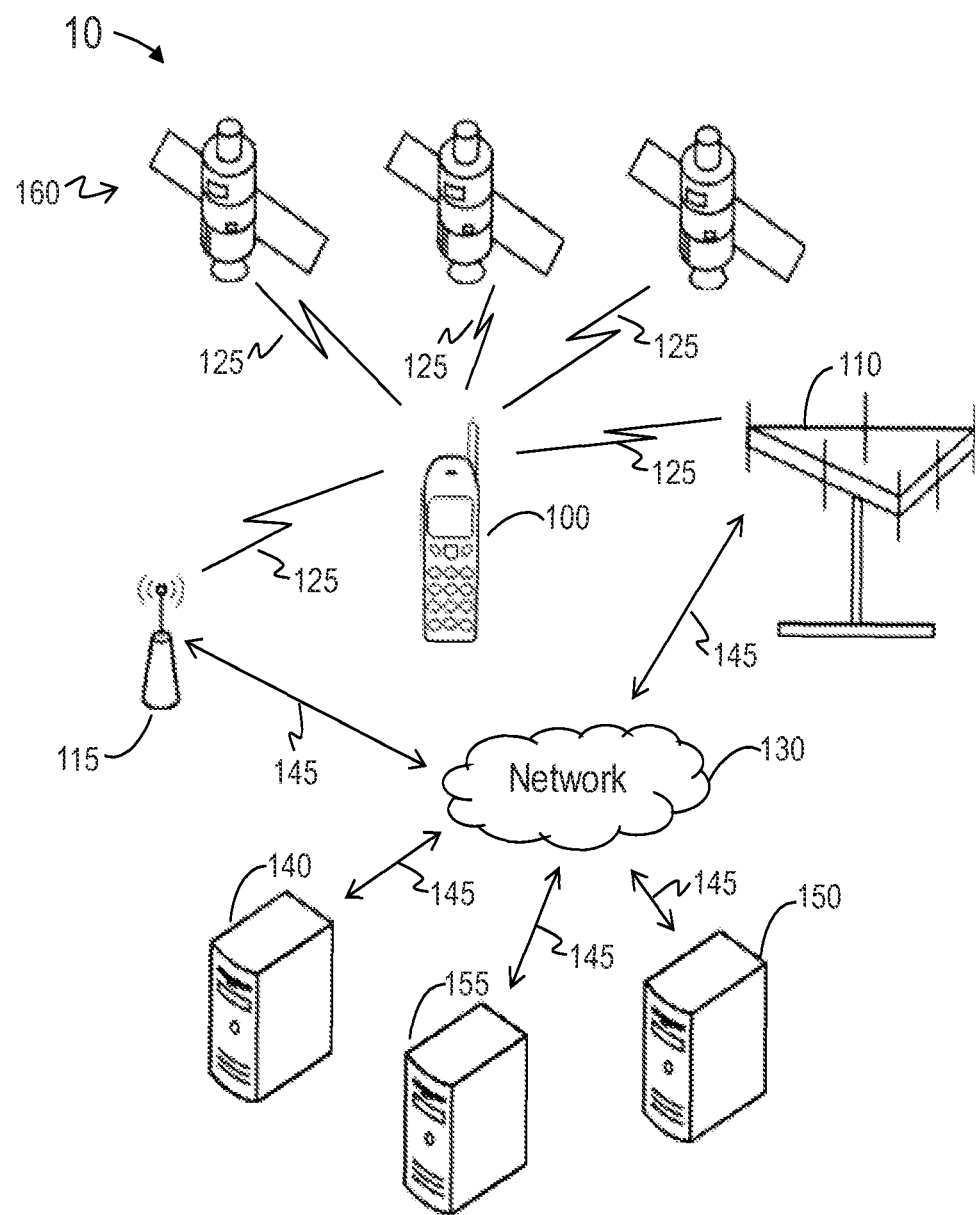
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for displaying digital maps, such as digital maps of an indoor area, on a mobile device, for example, and that claimed subject matter is not limited in this regard. It should also be noted that the terms "position" and "location" may be used interchangeably herein.

As used herein, the term "point of interest" or "POI" may refer to a specific useful or interesting point location on a digital map or other type of diagrammatic representation of an area showing physical features. Thus, POIs may include bathrooms, room names, stores, kiosks, elevators, escalators, restaurants, or the like, which may be overlaid on a digital map of a shopping mall, stadium, town square, amphitheater, parking garage, amusement park, or other area. An electronic digital map may, for example, be stored at a suitable server to be wirelessly accessible by a mobile device, such as via a selection of a Uniform Resource Locator (URL), for example. By obtaining a digital map of an indoor or like area of interest, a mobile device may, for example, be capable of overlaying its current location on the displayed map of the area so as to provide a user with additional context, frame of reference, or the like.

Also as used herein, the term "alphanumeric identifier" may comprise a unique combination of one or more of letters and numerals that identifies a POI. It should be noted, however, that an alphanumeric identifier for a POI may be used to indicate a POI that is at least "locally unique." In one possible example, an alphanumeric identifier corresponding to an entrance of an amusement park may be reused at another entrance to an amusement park located, for example, in another city, state, or region, and the claimed subject matter is not limited in this respect.

If a display device becomes cluttered with multiple POIs, a user may experience difficulty in discerning the precise location of a particular POI relative to other POIs in which the user may have an interest in visiting, for example. In one instance, responsive to a user's search query concerning locations of restaurants in a large shopping mall, a user may find that a large number of restaurants and other food vendors are concentrated within a tightly confined area of the shopping mall. Further, even while viewing the display device at a higher zoom level, the user may find it difficult to distinguish favored restaurants from other eating establishments. This can be especially problematic if multiple POIs are indicated using a single color.

An approach for rendering POIs on indoor maps for display device on a mobile device may include, for example, embedding a color identifier or other symbol into program source code or other executable object running on the mobile device. In other instances, a predefined table may be used to rigidly bind a POI to a color used in displaying the POI. Accordingly, colors specified in a digital map may not be based on, for example, whether the color is optimal for use with the display device of the mobile device, available lighting conditions, zoom level, current search terms, and user handicaps (e.g., colorblindness), and/or a user's cultural preferences. In addition to the inflexibility of some approaches, pre-defined mapping tables between POIs and colors may occupy a large amount of storage capacity, which may be especially burdensome for small mobile devices with limited memory capacity.

In one particular implementation, a digital map may represent POIs in an area covered by the digital map using metadata which may include, for example, location coordinates of the POI and at least locally unique identification information. The identification information may include, for example, an alphanumeric identifier. Such an alphanumeric identifier may comprise a concatenation of characters and/or symbols which may be encoded, for example, in an ASCII file, a Unicode file, or other encoding scheme. A digital map received at a mobile device from a map server may convert or map alphanumeric identifiers of POIs to colors that represent locations in an image of the digital map rendered on a display device. In one implementation, characters in an alphanumeric identifier of a POI may be converted to a RGB triplet for use in generating a color at a location of the POI in the rendered map.

A hash table or other associative array may be used responsive to detection that two or more different alphanumeric identifiers, corresponding to two or more different POIs, for example, map to an identical or nearly-identical RGB triplet. In such an instance, one or more mathematical functions may be used to convert the two or more identifiers to provide a corresponding number of different RGB triplets. In implementations, an algorithm may be extended to color spaces other than RGB, such as sRGB (standard RGB), HSV (hue, saturation, and value), YUV (luminance, U color difference, and V color difference), LAB (luminance, color channel A, and color channel B), and/or other color space.

In implementations, different colors may be used for indicating locations of different types of POIs. For example, in a RGB color space, different colors may be used to depict different types of stores and similar colors may be used to depict similar types of stores. In another example, in a YUV color space, similar types of stores may be depicted using different luminance values having the same or similar chrominance values. In another example, in a LAB color space, similar types of stores may be depicted using different luminance values (L) and/or different A and B color channels. Further, certain POI colors may be excluded from display according to a user's particular handicaps, such as colorblindness, or a user's ethnic and/or cultural inclinations. In other instances, a color may be assigned to a POI based, at least in part, in accordance with a brand identity associated with a POI.

POIs may be recolored based on a theme in which, for example, a base color may be chosen and mixed (e.g., added or alpha-blended) with one or more colors computed from a unique alphanumeric identifier of a POI. In an example of alpha blending, a theme color or an image comprising more than one color may be multiplied by a first transparency factor (e.g., "$\alpha$"), while a second color may be multiplied by a second transparency factor (e.g., "$1.0-\alpha$"). For the case of such addition or blending, a base color may be chosen by a particular user or may be automatically chosen by a theme of subsets of POIs (e.g., electronics stores may share a same or similar base color). A theme color may be pre-defined or even chosen based on the current season's fashion color specified by the vendor. Such a base color may also be determined by other factors, and claimed subject matter is not limited in this respect.

FIG. 1 is a schematic diagram of a network topology 10 according to an embodiment. As described below, one or more processes or operations for rendering indoor maps on a display device may be implemented in a signal environment that may be utilized by a mobile device 100, for example. It should be appreciated that network topology 10 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, network topology 10 may comprise, for example, one or more space vehicles 160, base transceiver station 110, wireless transmitter 115, etc. capable of communicating with mobile device 100 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Base transceiver station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more base transceiver stations 110, wireless transmitters 115, etc. may, for example, be operatively coupled to a network 130 that may comprise one or more wired or wireless communications or computing networks capable of providing suitable information, such as an electronic digital map, via one or more wireless communication links 125, 145, and so forth. As discussed below, information may include, for example, an electronic digital map (e.g., floor plans, etc.) associated with an indoor or like area of interest (e.g., a shopping mall, retailer outlet, etc.) that may be provided to a mobile device by a transmitter, such as one or more of servers 140, 150, and 155, at or upon entering the area. In particular implementations, an electronic digital map may include POIs within the area of interest, such as restaurants, cafés, pubs, restrooms, stores, kiosks, elevators, escalators, restaurants, and so forth.

Even though a certain number of computing platforms or devices are illustrated herein, any number of suitable computing platforms or devices may be implemented to facilitate or otherwise support one or more techniques or processes associated with network topology 10. For example, at times, network 130 may be coupled to one or more wired or wireless communications networks (e.g., Wi-Fi, etc.) so as to enhance a predominantly indoor coverage area for communications with mobile device 100, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2:
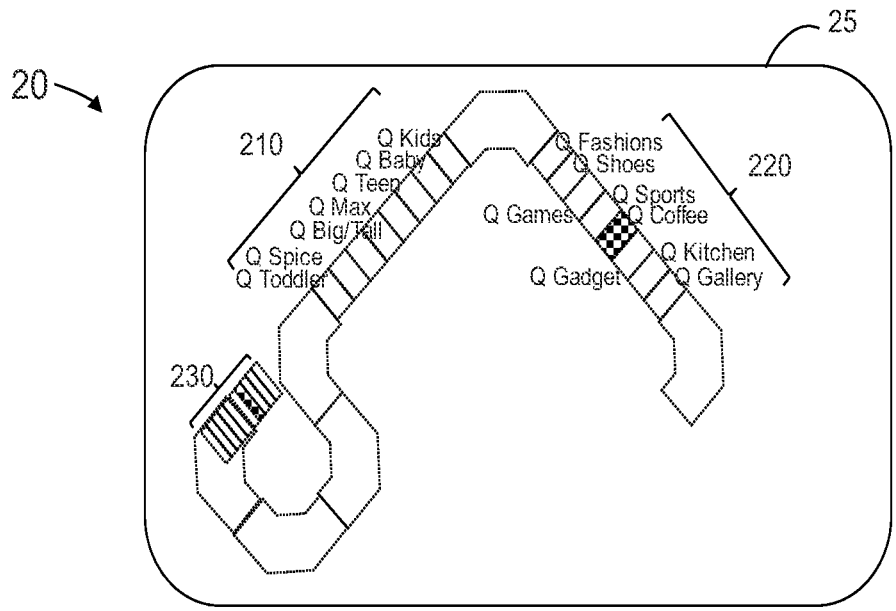
FIG. 2 is a schematic diagram of a layout of an indoor environment in which an embodiment of a method for rendering indoor maps on a display device may be employed.

FIG. 2 is a schematic diagram 20 of a display device showing an image of an indoor environment in which a method for rendering indoor maps on a display device may be employed according to an embodiment. In implementations, rendering on display device 25 of FIG. 2 may be in response to a server, such as one or more of servers 140, 150, and 155, transmitting a digital map to mobile device 100, for example, by way of wireless network 130 and wireless transmitter 115 of FIG. 1. Responsive to such transmission, mobile device 100 may render the digital map using display device 25. It should be pointed out, however, that display device 25 may render a digital map by way of other means, and claimed subject matter is not limited in this regard.

Display device 25 of FIG. 2 may present an image of a digital map that represents at least a portion of an indoor shopping mall having a variety of POIs, such as retail stores 210, 220, and food vendors within region 230. In the embodiment of FIG. 2, it can be seen that various retail establishments are visible on display device 25. These include kids stores (Q Kids), baby stores (Q Baby), teen stores (Q Teen), big and tall stores (Q Big and Tall), coffee shops (Q Coffee), and others. In many instances, a user may make use of such a map to navigate through crowded shopping malls, for example, to shop, meet friends, attend venues, and so forth.

However, while attempting to discern finer features of a digital map displayed on display device 25, a user may find that doing so may be difficult. For example, if a user is attempting to locate a particular vendor, perhaps at region 230 of FIG. 2, for example, the user may find that identifying the particular vendor within the image of the digital map is not an easy task. For example, if region 230 represents a series of food vendors at a shopping mall, for example, the user may find that the graphics and/or other icons are too closely spaced in the image to be readily discernible. In such instances, a cluttered image may reduce the effectiveness of a digital map displayed on a user's mobile device.

Accordingly, in particular implementations, perhaps least partially in response to a user query, a device may indicate one or more particular POIs in an image using a color to render the particular POIs that is distinguishable from other colors used to render other POIs. For example, in FIG. 2, at least partially in response to a user query comprising the search term "coffee," the POI "Q Coffee" may be depicted using a color that is easily distinguished from other colors used to indicate POIs by way of display device 25. For example, as shown in FIG. 2 the POI "Q Coffee" can be seen rendered with a checkerboard pattern to represent a color that distinguishes Q Coffee from other POIs rendered on display device 25. The use of easily distinguishable colors to identify POIs may be especially useful if, for example, smaller features of a digital map, such as POIs are within region 230. POIs may be rendered using any number of easily distinguishable colors, patterns, and textures, and claimed subject matter is not limited in this respect.

Figure 3:
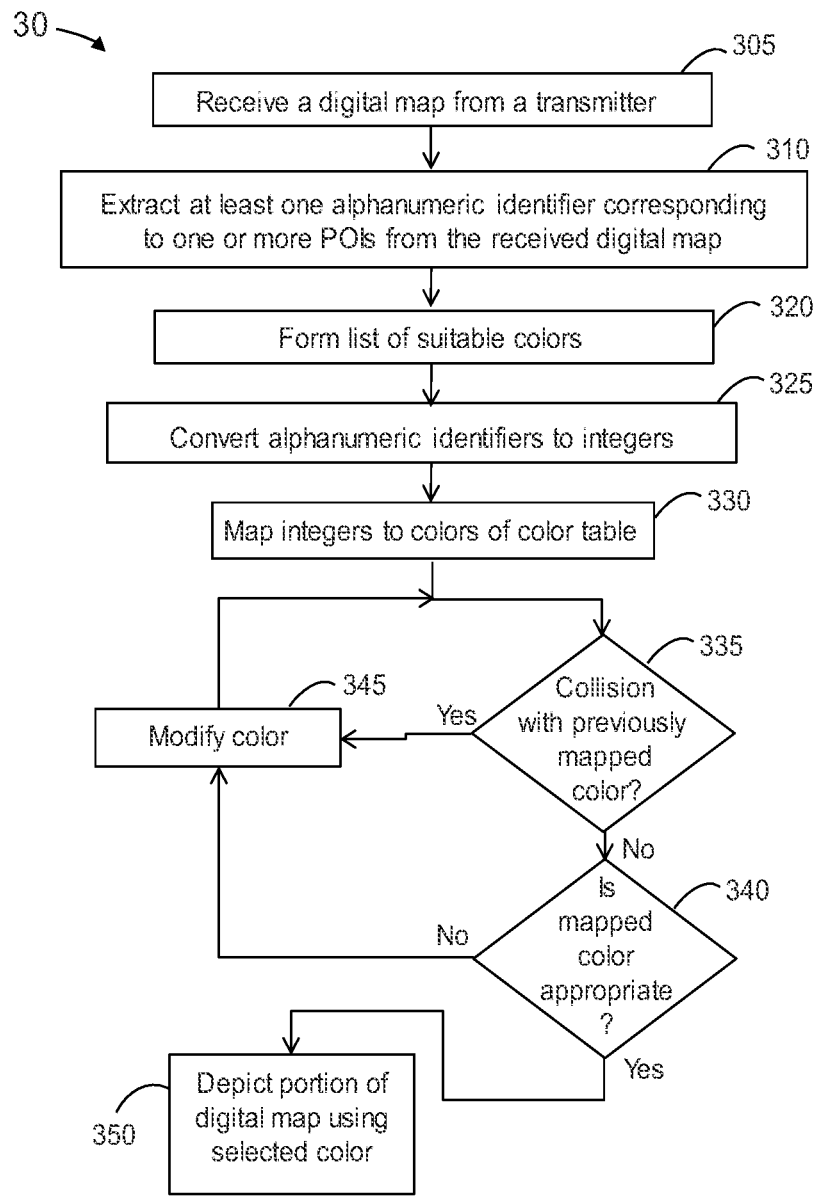
FIG. 3 is a flow diagram of a method for rendering indoor maps on a display device according to an embodiment.

FIG. 3 is a flow diagram of a method 30 for rendering indoor maps on a display device according to an embodiment. The computing environment of FIG. 5, discussed below, may be suitable for performing the method of FIG. 3; however, claimed subject matter is not limited to the particular implementation of FIG. 4, and alternate arrangements of components in other implementations may be used. Example implementations, such as those described in FIG. 3 and others herein, may include blocks in addition to those shown and described, fewer blocks, blocks occurring in an order different than may be identified, or any combination thereof.

The method of FIG. 3 begins at block 305 in which a mobile device may receive a digital map from a transmitter, such as a map server. A transmitter may communicate with a mobile device by way of a wireless access point such as wireless transmitter 115 of FIG. 1. However, in certain implementations, a digital map may be loaded and/or accessed by a mobile device at least partially in response to communicating with other wireless devices, such as wireless LANs, wireless beacons, cellular base stations, femtocells, or the like. In particular implementations, a first mobile device carried by a user may receive a digital map from a second mobile device tethered to a laptop computer having an Internet connection to create a mobile "hotspot." It should be noted that claimed subject matter is intended to embrace all such methods and systems in which a digital map may be downloaded or otherwise made accessible to a mobile device.

At block 310, a processor of a mobile device may extract one or more alphanumeric identifier from a received digital map. In certain implementations, an alphanumeric identifier of a POI may comprise a 17-character identifier such as, for example, Ab1234Cd__567890_e. However, alphanumeric identifiers may comprise many combinations and/or concatenations of characters or symbols in various arrangements, and claimed subject matter is not limited in this respect. For example, alphanumeric identifiers may vary in length from 10 characters or less, for example, to perhaps 20 characters, or more. Further, conversion to other numbering schemes, such as to signed or unsigned floating-point values, hexadecimal values, and so forth, may be employed, and claimed subject matter is intended to embrace all such conversions. Block 310 may additionally comprise enumerating alphanumeric identifiers pertaining to at least a portion of a received digital map. In embodiments, alphanumeric identifiers may number into the dozens, hundreds, or more, and claimed subject matter is not limited to any particular number of alphanumeric identifiers. Block 320 may comprise forming a list of suitable colors may be selected from a color space to give rise to appropriate distance between preselected colors. A list of colors may be approximately evenly distributed in a color space or may be selected to favor or to avoid certain colors. Block 320 may benefit a user by providing increased separation among colors used to depict POIs on a display device. At block 325, an alphanumeric identifier of a POI may be converted to an integer, such as a long integer comprising four bytes of memory and having, for example, a range of −2,147,483,648 to +2,147,483,647. In particular implementations, an alphanumeric identifier such as Ab1234Cd__567890_e may first be reduced to comprise only numerical values, such as, 1234567890. In block 330, a numerical value may be mapped to a HSV color space expressed as a triplet (0°-360°, 0%-100%, 0%-100%). Accordingly, a numerical value of 1234567890 may correspond, for example, to a triplet in a HSV color space of 123.0° (hue), 45.6% (saturation), and 78.90% (value). In a HSV color space, the sons correspond to approximately green hue having saturation of approximately 45.6%, and value of 78.9%. In other implementations, a numerical value may be mapped to a RGB color space expressed as an integer triplet of (0-255, 0-255, 0-255). Thus, a numerical value of 1234567890 may correspond, for example, to a triplet in a RGB color space of red=123.0, green=255*(0.456), and blue=255*(0.789). Carrying out these multiplications may yield a RGB triplet of (123, 116, 201), which corresponds to an approximately lavender color. It should be noted that claimed subject matter is not limited to any particular scheme by which alphanumeric identifiers of one or more POIs may be converted to a numerical value that corresponds to a color in a particular color space.

At block 335 a determination may be made as to whether a recently mapped color, such as a color mapped in block 330, "collides" with a previously mapped color (e.g., two or more numerical values map to an identical or nearly identical color). For example, if two or more similar numerical values are extracted from a corresponding number of alphanumeric identifiers of POIs, there is a possibility that colors to be mapped to POIs may be identical or at least similar enough so as to be difficult to distinguish among one another while displayed on display device 25. Thus, for example, at least partially in response to a search query for "coffee," a user may be presented with a display wherein the establishment "Q Coffee" has been rendered in a color that is indistinguishable from one or more colors mapped to for adjacent POIs.

Thus, at block 335, a processor of a mobile device may determine whether a previously mapped color may collide with a color currently mapped to a POI. If it appears that a color currently mapped to a POI is identical or nearly identical to a previously mapped color, block 345 may be performed in which an integer, signed or unsigned floating-point value, or other numeric identifier, may be modified to map to a color that may be more distinguishable from one or more previously mapped colors. In at least one implementation, an integer, such as 1234567890 may be squared and truncated, yielding 1524157875, which may map to a HSV triplet of hue=152.0°, saturation=41.5%, and value=78.75%, which corresponds to an approximately turquoise color.

It should be noted that a variety of techniques may be used to implement block 360. For example, as previously noted, an integer numeric value extracted from an alphanumeric identifier of a POI may be squared or otherwise mathematically manipulated to produce a different integer value. In other implementations, an associative array or other data structure may be used to map an input integer value to a unique output value. In at least one implementation, an associative array may comprise a hash table or hash map in which an input integer maps to a unique output. Accordingly, by way of implementing an associative array, such as a hash table or other data structure, a mobile device may be capable of mapping input integers having minute variations from one another, for example, into a corresponding number of visually distinguishable colors used to depict POIs in an image.

Returning now to the method of FIG. 3, if the decision of block 335 indicates that a color currently under consideration for mapping to a POI is sufficiently visually distinguishable from a previously mapped color, block 340 may be performed in which a decision may be made as to the suitability of a particular color. Such suitability may be related to a user's colorblindness, such as, for example, red-green colorblindness in some men. Thus, in the event that two or more mapped colors are likely to be visually indistinguishable to a user, block 345 may be performed so that a different color may be mapped to a POI. In at least one implementation, an integer value may be squared or may undergo any other mathematical manipulation so that the modified integer maps to a sufficiently different integer representation of color, and claimed subject matter is intended to embrace all such manipulations. At block 350, if mapped colors are appropriate, the portion of the digital map is depicted using the mapped color.

Returning to block 340, it may be appreciated that one or more colors from an available color space may be less suitable for display than other colors. For example, as previously mentioned, a user may possess a colorblindness that diminishes a capability to discern among two or more colors that other mobile device users may be capable of distinguishing. In other examples, a user may possess certain cultural inclinations that avoid use of certain colors. For example, user of South African descent may have a dislike for the color red, given that red may imply mourning in that region. Likewise, a user of South American descent may have a dislike for the color green, given that in many Latin and South American cultures, green may be associated with mourning. Accordingly, in some implementations, the method of FIG. 3 may include additional blocks which may allow, for example, a user to input a profile that allows certain colors to be excluded from use in depicting POIs on display device 25.

On the other hand, in implementations, a mobile device user may choose to input favorable colors according to various cultural preferences for certain colors. For example, a mobile device user of Chinese descent may prefer, especially in response to a search query for restaurants, for example, that certain POIs to be displayed in red, given that red may signify happiness and luck. In another example, a mobile device user who prefers vegetarian cuisine may also prefer that vegetarian or vegan restaurants be depicted in green. Thus, for several reasons, a mobile device user may benefit from controlling or at least influencing colors used to depict POIs rendered on a display device of the mobile device, and claimed subject matter is intended to embrace all manners in which such control may be input by a user.

In some implementations, colors mapped to a POI for display on a mobile device may be dynamically modified based on ambient lighting conditions under which the mobile device is being used. For example, in the event that a user is operating a mobile device under low-light conditions, such as may be encountered if the user is in the audience during a concert, play, or other live performance, the user may not wish to disturb nearby audience members with an overly bright display. Thus, the user may prefer that all displayed POIs be depicted in white or gray with the background of the image rendered in darker colors, such as black or brown. In other instances, it may be advantageous for colors mapped to a POI for presentation on a mobile device to be dynamically modified based a condition of the battery or other component of the mobile device. For example, if a monitoring circuit senses that the battery is low, a processor of the mobile device may direct a display device to be illuminated using preferably darker colors, so as to minimize the power consumption of the display device.

In some implementations, depiction of a portion of a digital map on a display device to be influenced by a number of POIs intended for display. For example, if a user wishes to display a complicated indoor map, perhaps comprising 30 or more POIs, a processor of a mobile device may map colors to POIs using a color scheme that provides suitable separation between or among displayed colors. For example, colors mapped to the 30 or more POIs may correspond to approximately ten colors having a reddish hue, approximately ten colors having a greenish hue, and approximately ten colors having a bluish hue. However, if a user initiates a "zoom" function, in which, for example, perhaps only three POIs are scheduled for display, a processor of a mobile display device may modify map colors to POIs using a color scheme that provides increased separation between or among display colors. Accordingly, for example, a single color having a reddish hue, a single color having a greenish hue, and a single color having a bluish hue may be displayed. Such color separation may enable the user to easily distinguish among displayed POIs. However, this represents only a single coloration scheme among many possible coloration schemes, and claimed subject matter is not so limited.

In some implementations, depiction of a portion of the digital map on a display device of a mobile device may be influenced by one or more types of POIs scheduled for display. For example, responsive to a user's search query for "restaurants" within an indoor venue, certain restaurants may be depicted using a first color, while other restaurants may be depicted using a second color. For example, a Chinese restaurant may be depicted using red or reddish hues, a Southwestern style restaurant may be depicted using a yellowish hue, and an Indian restaurant may be depicted using a greenish hue. In practice, a variety of color schemes may be employed, and claimed subject matter is intended to embrace all such schemes in which a color mapped for depiction of a POI is based, at least in part, on the type or category of a POI.

As mentioned previously, in particular implementations, colors used for depiction of POIs may be alpha blended. In one example, Chinese grocery stores, restaurants, and imported products stores may be colored using a red background having a transparency corresponding to, for example, a variable "α," in which a varies between 0.0 and 1.0. Thus, POIs depicting Chinese grocery stores, may be depicted using a red background ($\alpha$) and may be blended with, for example, a dark green hue having a transparency corresponding to $(1.0-\alpha)$, wherein the dark green hue may indicate fresh vegetables available at the grocery store. Likewise, POIs depicting Chinese imported products stores may be depicted using a red background ($\alpha$) and blended $(1.0-\alpha)$ with, for example, a lighter green hue to indicate the availability of, for example, Chinese jade jewelry. Similarly, POIs depicting a Chinese restaurant may be depicted using a red background ($\alpha$) and blended $(1.0-\alpha)$ with, for example, a beige hue to indicate the availability of fortune cookies. Of course, a variety of color background, transparency, and blending schemes are possible, and claimed subject matter is not limited in this regard.

In particular implementations, color mapping for depiction of one or more POIs may be determined by, or at least influenced by, a brand identity of an alphanumeric identifier of POI. For example, a retail outlet may make use of a particular color associated with a brand identity. Accordingly, while depicting a portion of a digital map at which a particular outlet store is located, a color that conveys a brand identity may be used. In one example, of which many examples are possible, if depicting the GAP™, a particular shade of blue may be used. In certain embodiments, a merchant, such as a clothing store, food vendor, service provider, and so forth, may provide a consideration, such as a fee, to a digital map provider to ensure that colors are mapped for depiction on digital maps according to brand identity, for example.

Figure 4:
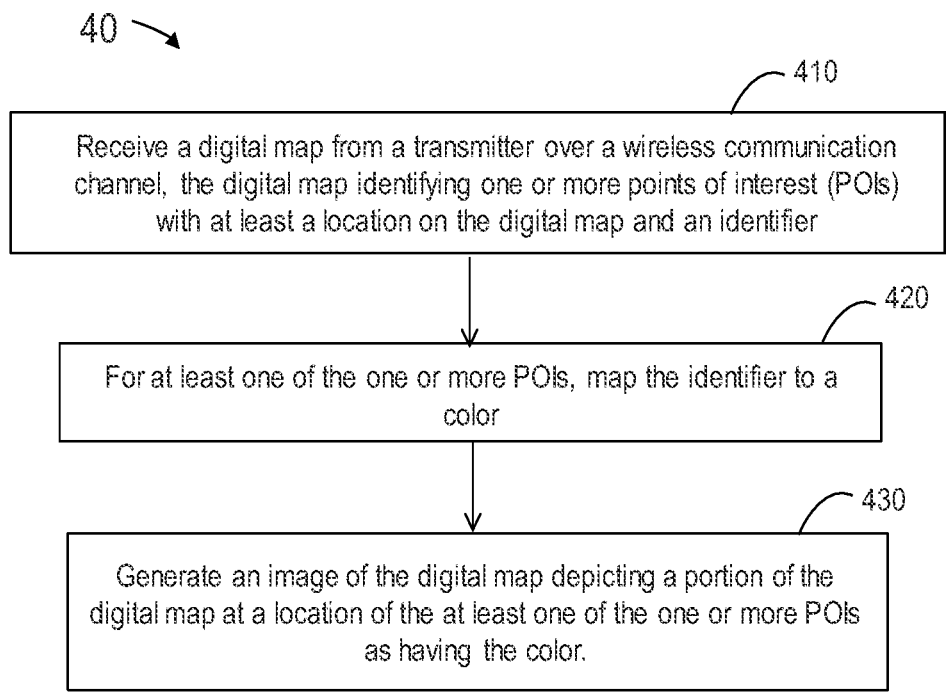
FIG. 4 is a simplified flow diagram of a method for rendering indoor maps on a display device according to an embodiment.

FIG. 4 is a simplified flow diagram 40 of a method for rendering indoor maps on a display device according to an embodiment. The computing environment of FIG. 5 may be suitable for performing the method of FIG. 4. However, claimed subject matter is not limited to the particular implementation of FIG. 5 and alternate arrangements of components in other implementations may be used. Example implementations, such as those described in FIG. 4 and others herein, may include blocks in addition to those shown and described, fewer blocks, blocks occurring in an order different than may be identified, or any combination thereof.

The method of FIG. 4 begins at block 410 in which a digital map of an indoor area is received from a transmitter, such as a map server, by way of a wireless communications channel.

In implementations, block 410 may include, for example, upon entering an area, receiving an electronic digital map that may include POIs within the area of interest, such as restrooms, restaurants, cafés, pubs, and so forth. However, claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

At block 420, the method continues with mapping one or more alphanumeric indicators of POIs to a corresponding number of colors. In implementations, an alphanumeric identifier may be converted to a numeric identifier and used to map a color in a RGB space, a HSV space, or other color space. In the event of a collision between two colors (e.g., two or more identical or nearly identical colors are mapped to a corresponding number of POIs) an associative array, such as a hash table, may be used to remap colors to be used to depict POIs on a display device for colors may also be dynamically assigned to POIs based, at least in part, on inputs received from a user. Such inputs may pertain to a user's particular handicaps, such as colorblindness; a user's ethnic and/or cultural inclination; and so forth. Inputs may also pertain to a user-initiated search query for certain types of establishments, such as restaurants, stores, etc. In these instances, and others, a dynamically mapped color may be used to depict one or more POIs based, at least in part, on and input received from a user. At block 430, an image of a digital map is generated on the display device. In implementations, the generated image depicts a portion of the digital map at a location of at least one or more POIs using the colors mapped in block 420.

Figure 5:
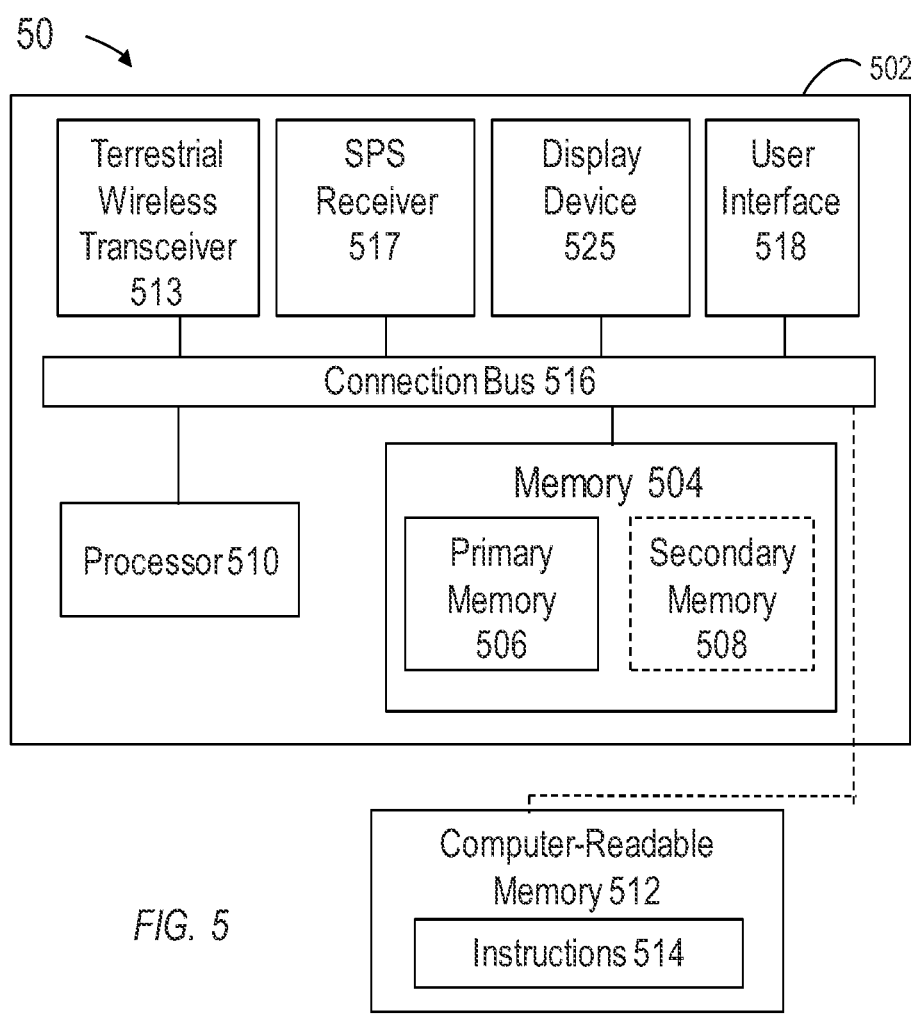
FIG. 5 is a schematic diagram showing certain features of a mobile device for rendering indoor maps on a display device according to an embodiment.

FIG. 5 is a schematic diagram illustrating certain features of a computing environment 50 for rendering indoor maps on a display device according to an example implementation. It may be appreciated that all or part of various devices or networks shown in computing environment 50, processes, or methods, as described herein, may be implemented using various hardware, firmware, or any combination thereof along with software. A computing environment may include, for example, a mobile device 502, which may be communicatively coupled by way of a communications channel (such as Wi-Fi, Bluetooth, or the like) to any number of other devices, mobile or otherwise, via a suitable communications network, such as a terrestrial cellular telephone network, the Internet, a mobile ad-hoc network, a wireless sensor network, a wireless access point, a Piconet, a femtocell, or the like. In an implementation, mobile device 502 may be representative of any electronic device, appliance, or machine that may be capable of exchanging information over a suitable wireless communications network. For example, mobile device 502 may comprise a transceiver and one or more processors, such as processor 510, to initiate the reception of electronic signals representing a digital map over a wireless communication channel, wherein the digital map identifies at least one POI with at least a location on the digital map and an alphanumeric identifier. The one or more processors may map the alphanumeric identifier to a color for the at least one POI, and initiate the generation of an image of the digital map on a display device of the mobile device, such as display device 525, wherein the generated image depicts a portion of the digital map at a location of the at least one POI using the color mapped from the alphanumeric identifier.

Processor 510 of mobile device 502 may additionally map the alphanumeric identifier to a numeric representation of the color in a color space such as a RGB color space, a HSV color space, or other model that describes the manner in which colors may be represented as combinations of letter and/or numbers. Processor 510 may additionally apply a hash table to two or more alphanumeric identifiers if corresponding numeric representations of color in the color space collide (e.g., identical or nearly identical colors are mapped for display of more than one POI). In certain implementations, processor 510 may direct display device 525 to modify or remap the color of the at least one POI responsive to a signal indicating a condition of a battery of mobile device 502. Processor 510 may direct the remapping of color used to depict a POI from a first color to a second color, wherein the second color is darker than the first color so as to reduce a brightness level of display device 525. In particular implementations, processor 510 may direct, at least partially in response to receiving a signal indicating ambient light, modify one or more colors used to depict POIs. Alternatively, or in addition, processor 510 may access a memory device, such as memory 504, to determine a brand and/or color associated with an alphanumeric identifier.

In certain implementations, processor 510 may additionally receive an input from a user, by way of user interface 518, for example, wherein the input indicates the user capability to differentiate among at least two colors (e.g., colorblindness). Processor 510 may additionally receive an input from a user that represents an indication of a user's color preference. Processor 510 may also receive inputs from a user that represents a selected zoom level of a display device, and/or may receive one or more search terms from a user.

In certain example implementations, mobile device 502 may take the form of one or more integrated circuits, circuit boards, or the like that may be operatively enabled for use in another device. Although not shown, optionally or alternatively, there may be additional devices, mobile or otherwise, communicatively coupled to mobile device 502 to facilitate or otherwise support one or more processes associated with computing environment 50. Thus, unless stated otherwise, to simplify discussion, various functionalities, elements, components, etc. are described below with reference to mobile device 502 may also be applicable to other devices not shown so as to support one or more processes associated with example computing environment 50.

Memory 504 may represent any suitable or desired information storage medium. For example, memory 504 may include primary memory 506 and a secondary memory 508. Primary memory 506 may include, for example, a random access memory, read only memory, etc. While illustrated in this example as being separate from a processing unit, it should be appreciated that all or part of primary memory 506 may be provided within or otherwise co-located/coupled with processor 510. Secondary memory 508 may include, for example, the same or similar type of memory as primary memory or one or more information storage devices or systems, such as, for example, a disk drive, an optical disc drive, a tape drive, a solid state memory drive, etc. In certain implementations, secondary memory 508 may be operatively receptive of, or otherwise enabled to be coupled to, a non-transitory computer-readable medium 512.

Computer-readable medium 512 may include, for example, any medium that can store or provide access to information, code or instructions, such as instructions 514 printed thereon (e.g., an article of manufacture, etc.) for one or more devices associated with computing environment 50. For example, computer-readable medium 512 may be provided or accessed by processor 510. As such, in certain example implementations, the methods or apparatuses may take the form, in whole or part, of a computer-readable medium that may include computer-implementable instructions stored thereon, which, if executed by at least one processing unit or other like circuitry, may enable processor 510 or the other like circuitry to perform all or portions of a location determination processes, with or without determining round-trip time of a message, within mobile device 502. In certain example implementations, processor 510 may be capable of performing or supporting other functions, such as communications, gaming, or the like.

Processor 510 may be implemented in hardware or a combination of hardware and software. Processor 510 may be representative of one or more circuits capable of performing at least a portion of information computing technique or process. By way of example but not limitation, processor 510 may include one or more processors, controllers, microprocessors, microcontrollers, application specific integrated circuits, digital signal processors, programmable logic devices, field programmable gate arrays, or the like, or any combination thereof.

Mobile device 502 may include various components or circuitry, such as, for example, terrestrial wireless transceiver 513, SPS receiver 517, and/or various other sensor(s), such as a magnetic compass, an inductive loop antenna to enable near field communications, a gyroscope, etc. to facilitate or otherwise support one or more processes associated with computing environment 50. Although not shown, it should be noted that mobile device 502 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 502 may also include a memory or information buffer to collect suitable or desired information, such as, for example, received signal strength, as mentioned above. Mobile device 502 may also include a power source, for example, to provide power to some or all of the components or circuitry of mobile device 502. A power source may be a portable power source, such as a battery, for example, or may comprise a fixed power source, such as an outlet (e.g. in a house, electric charging station, etc.). It should be appreciated that a power source may be integrated into (e.g., built-in, etc.) or otherwise supported by (e.g., stand-alone, etc.) mobile device 502.

Mobile device 502 may include one or more connection bus 516 (e.g., buses, lines, conductors, optic fibers, etc.) to operatively couple various circuits together, and user interface 518 (e.g., display device, touch screen, keypad, buttons, knobs, microphone, speaker, trackball, data port, etc.) to receive user input, facilitate or support sensor-related signal measurements, or provide information to a user. Mobile device 502 may further include terrestrial wireless transceiver 513 (e.g., wireless transceiver, modulator and/or demodulator, upconverter and/or downconverter, antennas, etc.) to allow for communication between a mobile device and a transponder over one or more suitable communications networks.

In accordance with certain example implementations, wireless transmitter 115 (FIG. 1), transceiver station 110 (FIG. 1), and terrestrial wireless transceiver 513 of FIG. 5, may be enabled for operability with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, HRPD, Ultra Mobile Broadband (UMB), and/or the like. Additionally, terrestrial wireless transceiver may further provide for infrared-based communications with one or more other devices.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired outcome. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," "generating," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended, and equivalents thereof.

What is claimed is:

1. A method comprising, at a mobile device:
   receiving a digital map from a transmitter over a wireless communication channel, said digital map identifying one or more points of interest (POIs) with at least a location on said digital map and a first identifier;
   for at least one of said one or more POIs, mapping said first identifier to a first color, said first color being visually distinguishable from one or more previously mapped colors mapped using a second POI identifier; and
   generating an image of said digital map depicting a portion of said digital map at a location of said at least one of said one or more POIs as having said first color.

2. The method of claim 1, wherein mapping said first identifier to said first color further comprises mapping to a color space, and wherein said first identifier is expressed as a RGB triplet, a HSV triplet, a LAB triplet or a YUV triplet, or any combination thereof.

3. The method of claim 2, and further comprising applying said first identifier to an associative array based, at least in part, on a collision among said first color mapping to said color space and said one or more previously mapped colors.

4. The method of claim 3, wherein said applying further comprises using an associative array that corresponds to a hash table.

5. The method of claim 1, wherein said generating said image of said digital map further comprises dynamically modifying said first color based, at least in part, on ambient light conditions.

6. The method of claim 1, wherein said generating said image of said digital map comprises generating said image on a display device and dynamically modifying said first color based, at least in part, on receiving a signal indicating a condition of a battery of said mobile device.

7. The method of claim 1, wherein said generating said image of said digital map further comprises dynamically modifying said first color based, at least in part, on a user input signal.

8. The method of claim 7, wherein said dynamically modifying is responsive to receiving an indication that represents said user's capability to differentiate among at least two colors.

9. The method of claim 7, wherein said dynamically modifying is responsive to receiving an indication that certain colors are to be avoided.

10. The method of claim 7, wherein said dynamically modifying is responsive to receiving an indication of a selected zoom level.

11. The method of claim 7, wherein said dynamically modifying is responsive to receiving an indication of one or more terms of a search query.

12. The method of claim 7, wherein said dynamically modifying is responsive to receiving at least one input signal representing one or more favored colors selected by said user.

13. The method of claim 7, wherein said dynamically modifying comprises:
   blending a theme color with said color associated with said first identifier.

14. The method of claim 1, wherein said mapping said first identifier with said first color comprises:
   determining a brand associated with said first identifier and, at least partially in response to said determining, associating said first color with said brand associated with said first identifier.

15. The method of claim 1, wherein said generating comprises:
   generating said image of said digital map on a display device.

16. A mobile device comprising:
   a receiver configured to receive a digital map from a transmitter over a wireless communication channel, said digital map identifying at least one point of interest (POI) with at least a location on said digital map and a first identifier; and
   one or more processors, coupled to said receiver, to:
      map a first color to said at least one POI based, at least in part, on said first identifier of said at least one POI, said first color being visually distinguishable from one or more previously mapped colors mapped using a second POI identifier; and generate an image of a digital map, wherein said at least one POI is depicted on said image of said digital map with said first color.

17. The mobile device of claim 16, further comprising:
a display device for displaying said image of said digital map.

18. The mobile device of claim 16, wherein said one or more processors are further configured to:
map said first identifier to a numeric representation of said color in a color space.

19. The mobile device of claim 18, wherein said color space is a RGB color space, a HSV color space, a YUV color space, or a LAB color space, and wherein said numeric representation identifies a triplet of at least one of the following: a RGB color space, a HSV color space, a YUV color space, a LAB color space, or any combination thereof.

20. The mobile device of claim 18, wherein said one or more processors are further configured to:
apply a hash table to two or more identifiers if corresponding numeric representations of said colors in said color space collide.

21. The mobile device of claim 16, wherein said one or more processors are further configured to:
modify said first color of said at least one POI responsive to a signal indicating a condition of a battery of a display device.

22. The mobile device of claim 21, wherein said one or more processors are further configured to:
modify said first color of said at least one POI from a first color to a second color, wherein said second color is darker than said first color.

23. The mobile device of claim 16, wherein said one or more processors are further configured to:
modify, at least partially in response to receiving a signal indicating ambient light, said first color.

24. The mobile device of claim 16, wherein said one or more processors are further configured to:
direct said mobile device to receive an input from a user, said input indicating said user's capability to differentiate among at least two colors.

25. The mobile device of claim 16, wherein said one or more processors are further configured to:
direct said mobile device to access an input signal from a user, said input signal representing an indication of color preferences of said user.

26. The mobile device of claim 16, wherein said one or more processors are further configured to:
receive an input from a user, said user input signal representing a selected zoom level of a display device.

27. The mobile device of claim 16, wherein said one or more processors are further configured to:
blend a theme color for said at least one POI with a color mapped from said first identifier.

28. The mobile device of claim 16, wherein said one or more processors are further configured to:
determine a brand associated with said first identifier.

29. The mobile device of claim 16, wherein said one or more processors are further configured to:
direct said mobile device to access one or more search terms from a user.

30. An article comprising:
a storage medium comprising machine-readable instructions stored thereon which are executable by one or more processors of a mobile device to:

obtain at least a first identifier for one or more points of interest (POIs) over a wireless communications channel;

map said at least said first identifier to a numeric representation of a first color, said first color being visually distinguishable from one or more previously mapped colors mapped using a second POI identifier; and generate an image of a digital map, said generated image depicting a portion of said digital map at a location of one or more POIs as having said first color.

31. The article of claim 30, wherein said storage medium additionally comprises machine-readable instructions stored thereon which are executable by said one or more processors to:
apply said at least said first identifier to a hash table if a RGB triplet, a HSV triplet, a YUV triplet, or a LAB triplet, or any combination thereof, if triplets of said first color collides with said previously mapped color.

32. The article of claim 30, wherein said storage medium additionally comprises machine-readable instructions stored thereon which are executable by said one or more processors to:
map said at least said first identifier to a RGB triplet, a HSV triplet, a YUV triplet, a LAB triplet, or any combination thereof.

33. The article of claim 30, wherein said storage medium additionally comprises machine-readable instructions stored thereon which are executable by said one or more processors to:
modify said first color based, at least in part, on a user input signal to select a zoom level of a display device.

34. The article of claim 30, wherein said storage medium additionally comprises machine-readable instructions stored thereon which are executable by said one or more processors to:
blend a theme color with said first color associated with said at least said first identifier.

35. The article of claim 30, wherein said storage medium additionally comprises machine-readable instructions stored thereon which are executable by said one or more processors to:
access a query comprising one or more search terms from a user.

36. A mobile device comprising:
means for wirelessly receiving a digital map from a transmitter, said digital map identifying one or more points of interest (POIs) with at least a location on said digital map and a first identifier;

means for mapping said first identifier to at least one of said one or more POIs to a first color, said first color being visually distinguishable from one or more previously mapped colors mapped using a second POI identifier; and means for generating an image of said digital map, said generated image depicting a portion of said digital map at a location of said at least one of said one or more POIs as having said first color.

37. The mobile device of claim 36, and further comprising;
means for modifying a color displayed on a display device based, at least in part, on a collision of a mapped color and said previously mapped color.

38. The mobile device of claim 36, and further comprising;
means for dynamically modifying a color based, at least in part, on an input from a user.

39. The mobile device of claim 36, wherein said means for mapping includes means for alpha blending a first color with a second color.

40. The mobile device of claim 36, and further comprising;
means for modifying a color based, at least in part, on ambient light conditions.

41. The mobile device of claim 36, and further comprising;
means for modifying colors based, at least in part, on a zoom level.

42. The mobile device of claim 36, and further comprising;
means for mapping based, at least in part, on a brand associated with an identifier.

43. The mobile device of claim 36, and further comprising;
means for displaying said generated image of said digital map.

\* \* \* \* \*